(12) United States Patent
Gong

(10) Patent No.: US 10,033,283 B2
(45) Date of Patent: Jul. 24, 2018

(54) KNEE POINT DETECTION FOR POWER CONVERTER CONTROL

(71) Applicant: Infineon Technologies Austria AG, Villach (AT)

(72) Inventor: Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/350,737

(22) Filed: Nov. 14, 2016

(65) Prior Publication Data

US 2018/0138817 A1    May 17, 2018

(51) Int. Cl.
*H02M 3/335* (2006.01)

(52) U.S. Cl.
CPC .... *H02M 3/33507* (2013.01); *H02M 3/33515* (2013.01); *H02M 3/33523* (2013.01); *H02M 3/33576* (2013.01); *H02M 3/33592* (2013.01)

(58) Field of Classification Search
CPC ......... H02M 3/33507; H02M 3/33515; H02M 3/33523; H02M 3/33576; H02M 3/33592
See application file for complete search history.

(56) References Cited

U.S. PATENT DOCUMENTS

| | | | |
|---|---|---|---|
| 7,486,528 B2 | 2/2009 | Yang | |
| 7,567,445 B2 | 7/2009 | Coulson et al. | |
| 7,859,862 B2 | 12/2010 | Lin | |
| 2009/0290390 A1* | 11/2009 | Piper | H02M 3/33507 363/21.04 |
| 2010/0165666 A1* | 7/2010 | Wang | H02M 3/33523 363/21.01 |
| 2010/0246216 A1* | 9/2010 | Coulson | H02M 3/33523 363/21.12 |
| 2010/0289463 A1* | 11/2010 | Wang | H02M 3/33523 323/247 |
| 2011/0255308 A1* | 10/2011 | Chan | H02M 3/33507 363/21.12 |
| 2011/0255312 A1* | 10/2011 | Lin | H02M 3/33523 363/21.16 |
| 2012/0262961 A1* | 10/2012 | Chien | H02M 3/33507 363/84 |

(Continued)

*Primary Examiner* — Fred E Finch, III
*Assistant Examiner* — Demetries A Gibson
(74) *Attorney, Agent, or Firm* — Shumaker & Sieffert, P.A.

(57) ABSTRACT

A power converter includes a controller. The controller is configured to charge a capacitor of the controller based on a peak voltage applied to a primary-side winding of a transformer of the power converter. The controller is also configured to apply a discharge current defined by a first amount of current to the capacitor, and responsive to discharging the capacitor to a reference voltage level, determine, based on a feedback voltage generated by a primary-side auxiliary winding of the transformer, whether a discharge time of the capacitor is equal to a discharge time of the secondary-side winding. The controller is further configured to responsive to determining that the discharge time of the capacitor is not equal to the discharge time of the secondary-side winding, adjust the discharge current from the first amount of current to a second amount of current. The second amount of current is indicative of a predicted discharge time of a secondary-side winding of the transformer.

17 Claims, 7 Drawing Sheets

(56) References Cited

U.S. PATENT DOCUMENTS

| | | | | |
|---|---|---|---|---|
| 2013/0294118 A1* | 11/2013 | So | .................... | H02M 3/33507 |
| | | | | 363/21.16 |
| 2014/0029315 A1* | 1/2014 | Zhang | ............... | H02M 3/33507 |
| | | | | 363/21.13 |
| 2015/0103566 A1* | 4/2015 | Keogh | .............. | H02M 3/33507 |
| | | | | 363/21.12 |
| 2015/0280573 A1* | 10/2015 | Gong | ................ | H02M 3/33523 |
| | | | | 363/21.14 |
| 2016/0268907 A1* | 9/2016 | Chen | ................ | H02M 3/33507 |
| 2017/0025958 A1* | 1/2017 | Yu | ..................... | H02M 3/33515 |
| 2017/0077820 A1* | 3/2017 | Lu | .................... | H02M 3/33523 |
| 2017/0117812 A1* | 4/2017 | Furtner | ............ | H02M 3/33515 |

* cited by examiner

KNEE POINT DETECTION FOR POWER CONVERTER CONTROL

TECHNICAL FIELD

This disclosure relates to power converters, and more particularly, to techniques and circuits associated with power converters.

BACKGROUND

Some switch-mode power converters include transformers that provide a galvanic isolation layer between the power source and the load. A controller may regulate the voltage output by the power converter. The controller may receive a feedback voltage proportional to the output voltage to more accurately regulate the output voltage. Some controllers receive a feedback voltage from the secondary-side of the transformer, such that the feedback voltage must cross the isolation layer, which may require complicated and/or costly circuitry for the feedback voltage to cross the isolation layer. Some controllers control the power converter based on a feedback voltage generated by an auxiliary winding on the primary-side of the transformer. For example, a controller may detect a "knee point" in the feedback voltage and cause the power converter to adjust the output power in response to detecting the knee point. However, controllers that utilize the feedback voltage from the auxiliary winding may still be relatively complex and costly, and may not accurately detect the knee point voltage.

SUMMARY

In general, circuits and techniques are described for utilizing a primary-side feedback voltage to control a power converter. A controller may determine when the feedback voltage reached a knee point voltage for a first switching cycle, and based on the determination, may predict how long it will take the feedback voltage to reach the knee point voltage for a second switching cycle. By more accurately predicting when the knee-point voltage will occur, the controller may provide better control of the power converter.

In one example, the disclosure is directed to a power converter that includes a transformer, a switch, and a controller circuit. The transformer includes a primary-side winding, a primary-side auxiliary winding, and a secondary-side winding. The switch is configured to coupled and de-couple the primary-side winding to and from a voltage source. The controller circuit includes a capacitor. The controller circuit is configured to charge the capacitor based on a peak voltage applied to the primary-side winding, and after charging the capacitor, apply a discharge current defined by a first amount of current to the capacitor. The controller circuit is also configured to, responsive to discharging the capacitor to a reference voltage level, determine, based on a feedback voltage generated by the primary-side auxiliary winding, whether a discharge time of the capacitor is equal to a discharge time of the secondary-side winding. The controller circuit is further configured to, responsive to determining that the discharge time of the capacitor is not equal to the discharge time of the secondary-side winding, adjust the discharge current from the first amount of current to a second amount of current, wherein the second amount of current is indicative of a predicted discharge time of the secondary-side winding.

In one example, the disclosure is directed to a method of controlling a power converter. The method includes charging, by a controller of the power converter, based on a peak voltage applied to a primary-side winding of a transformer of the power converter, a capacitor of the power converter, and after charging the capacitor, applying, by the controller and to the capacitor, a discharge current defined by a first amount of current. The method also includes, responsive to discharging the capacitor to a reference voltage level, determining, by the controller and based on a feedback voltage generated by a primary-side auxiliary winding of the transformer, whether a discharge time of the capacitor is equal to a discharge time of a secondary-side winding of the transformer. The method further includes, responsive to determining that the discharge time of the capacitor is not equal to the discharge time of the secondary-side winding, adjusting, by the controller, the discharge current from the first amount of current to a second amount of current, wherein the second amount of current is indicative of a predicted discharge time of a secondary-side winding of the transformer.

In one example, the disclosure is directed to a controller circuit for controlling a power converter. The controller circuit includes a capacitor. The controller circuit is configured to charge the capacitor based on a peak voltage applied to a primary-side winding of a transformer of the power converter, and after charging the capacitor, apply a discharge current defined by a first amount of current to the capacitor. The controller circuit is also configured to, responsive to discharging the capacitor to a reference voltage level, determine, based on a feedback voltage generated by a primary-side auxiliary winding of the transformer, whether a discharge time of the capacitor is equal to a discharge time of the secondary-side winding. The controller circuit is further configured to, responsive to determining that the discharge time of the capacitor is not equal to the discharge time of the secondary-side winding, adjust the discharge current from the first amount of current to a second amount of current, wherein the second amount of current is indicative of a predicted discharge time of a secondary-side winding of the transformer.

In one example, the disclosure is directed to a controller that includes means for charging, based on a peak voltage applied to a primary-side winding of a transformer of the power converter, a capacitor of the power converter. The controller includes means for applying, to the capacitor, a discharge current defined by a first amount of current. The controller also includes means for determining, responsive to discharging the capacitor to a reference voltage level, based on a feedback voltage generated by a primary-side auxiliary winding of the transformer, whether a discharge time of the capacitor is equal to a discharge time of a secondary-side winding of the transformer. The controller further includes means for adjusting, responsive to determining that the discharge time of the capacitor is not equal to the discharge time of the secondary-side winding, the discharge current from the first amount of current to a second amount of current, wherein the second amount of current is indicative of a predicted discharge time of a secondary-side winding of the transformer.

The details of one or more examples are set forth in the accompanying drawings and the description below. Other features, objects, and advantages of the disclosure will be apparent from the description and drawings, and from the claims.

DETAILED DESCRIPTION

This disclosure describes techniques for controlling a power converter. The power converter may include a switch and a transformer, such that when the switch is turned-on a primary-side winding of the transformer is charged. When the switch is turned-off, the secondary-side winding of the transformer and an auxiliary primary-side winding are discharged. By turning the switch on and off over many switching cycles, the controller may regulate the power output by the power converter. A "switching cycle" may refer to a period of time when the switch turns-on one time and turns-off one time.

The controller may include an internal capacitor and may charge the internal capacitor while the primary-side winding of a transformer is charged. When the switch is turned-off, the controller may apply a discharge current to the internal capacitor. The controller may determine whether the internal capacitor discharged in the same amount of time as the secondary-side winding, where the amount of time it takes the secondary-side winding to discharge corresponds to the time it takes the feedback voltage generated by the auxiliary winding to reach the knee point voltage. By determining whether the secondary-side winding and the internal capacitor discharged in the same amount of time, and hence whether the internal capacitor discharged in the same amount of time it took for the feedback voltage to reach the knee point voltage, the controller may more accurately predict when the voltage of the secondary-side winding will be at the knee-point voltage in the future and may adjust the discharge current accordingly. By more accurately predicting when the knee-point voltage will occur, the controller may provide better control of the power converter.

Figure 1:
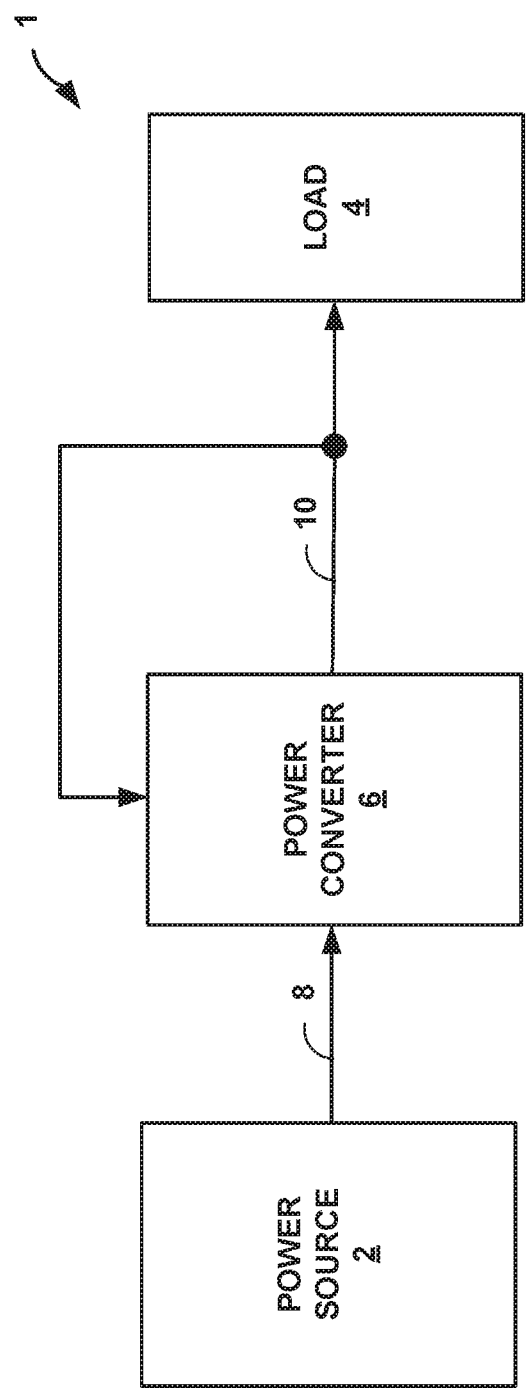
FIG. 1 is a block diagram illustrating an example system for converting power from a power source, in accordance with one or more aspects of the present disclosure.

FIG. 1 is a block diagram illustrating system 1 for converting power from power source 2, in accordance with one or more aspects of the present disclosure. FIG. 1 shows system 1 as having three separate and distinct components shown as power source 2, power converter 6, and load 4, however system 1 may include additional or fewer components. Power source 2, power converter 6, and load 4 may be three individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 6 which converts a power input at link 8 (e.g., from source 2) into a power output (e.g., for load 4) at link 10. In some examples, power converter 6 operates as a flyback converter. That is, flyback converter 6 may be a transformer-isolated converter that splits its inductor into one or more transformers to both multiply the voltage ratio between its input and output as well as to galvanically-isolate source 2 from load 4. In other examples, flyback converter 6 may be a LLC converter or other type of power converter.

System 1 further includes load 4. Load 4 receives the electrical power (e.g., voltage and current) converted by power converter 6. In some examples, the power converted by power converter 6 passes through a filter (not shown) before reaching load 4. In some examples, the filter is a sub-component of power converter 6, an external component of power converter 6, and/or a sub-component of load 4. In any event, load 4 may use the filtered or unfiltered electrical power from power converter 6 to perform a function.

Numerous examples of load 4 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 2 may provide electrical power with a first voltage and current level over link 8. Load 4 may receive electrical power that has a second voltage and current level, converted by power converter 6, over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4. In addition, link 10 provides a feedback loop or circuit for carrying information associated with the characteristics of the power output back to power converter 6.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10. Load 4 may receive the power that has the second voltage level at link 10. Load 4 may use the power having the second voltage level to perform a function (e.g., power a microprocessor, charge a battery, etc.).

Power converter 6 may receive information over link 10 associated with the power that has the second voltage level. For instance, feedback control circuitry of power converter 6 may detect a feedback voltage or feedback current level of the power output at link 10. A controller of converter 6 may adjust the power output at link 10 based on the detected feedback voltage or feedback current level. As a result the controller may cause power converter 6 to out a power with a voltage or current level that fits within a voltage or current level tolerance window required by load 4.

As will be described in more detail in FIGS. 2-6, the controller of power converter 6 may determine when the feedback voltage reaches the knee point for a first switching cycle. Based on the determination, the controller of power converter 6 may predict an amount of time for the feedback voltage to reach the knee point for a second switching cycle. By more accurately predicting when the knee point voltage will occur, the controller may more accurately determine when to turn-on the switches of the power converter, which may enable power converter 6 to better regulate the power output to load 4.

Figure 2:
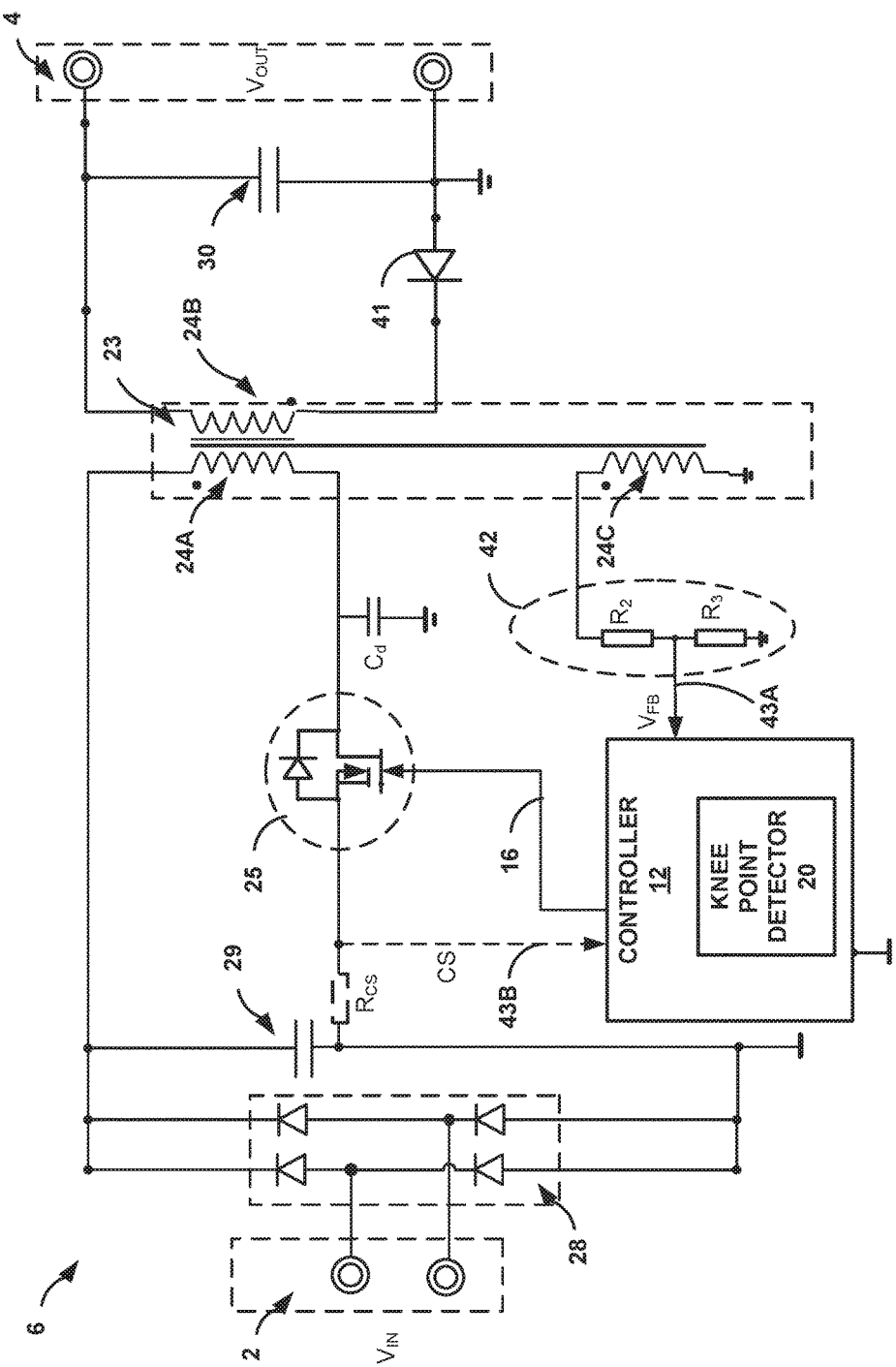
FIG. 2 is a circuit diagram illustrating an example power converter of the example system shown in FIG. 1, which is configured to perform flyback control, in accordance with one or more aspects of the present disclosure.

FIG. 2 is a circuit diagram illustrating an example power converter configured to perform flyback control, in accordance with one or more aspects of the present disclosure. Power converter 6 is a flyback converter and includes transformer 23. Transformer 23 provides isolation between a primary-side of power converter 6 and a secondary-side of power converter 6. Transformer 23 includes primary-side winding 24A, secondary-side winding 24B, and auxiliary winding 24C on the primary side of transformer 23.

Converter 6 includes controller circuit 12 (also referred to as "controller 12") positioned on the primary-side of power converter 6. In addition to controller 12, the primary-side of power converter 6 includes rectifier 28, input capacitor 29, and switching element 25. In the example of FIG. 2, switching element 25 is a transistor (e.g., a BJT, MOSFET, or other type of transistor) and includes a body diode. The primary-side of power converter 6 further includes voltage divider 42 coupled to auxiliary winding 24C of transformer 23. Controller 12 receives as input, the resistor divided feedback voltage $V_{FB}$ of auxiliary winding 24C and the common source voltage $V_{CS}$ associated with switching element 25 at link 43. Controller 12 outputs a gate control signal via link 16 for causing switching element 25 to turn-on or turn-off. In some examples, controller 12 may receive additional or fewer inputs than those shown in FIG. 2. In some examples, controller 12 may provide additional or fewer outputs than those shown in FIG. 2.

The secondary-side of power converter 6 includes output capacitor 30 in parallel to load 4 and secondary element 41 (e.g., a diode) arranged in series between secondary winding 24B and output capacitor 30/load 4.

Controller 12 may be a processor, an application-specific-integrated-circuit (ASIC), a microcontroller, a field-programmable-gate-array (FPGA), or any other type of processing device or processing unit configured to perform operations described herein. In some examples, controller 12 includes a memory, such as a non-transitory computer-readable storage medium and executes instructions stored thereon to perform operations described herein.

In operation, controller 12 may provide a gate control signal via link 16 to switching element 25 that causes the transistor of switching element 25 to turn-on or turn-off. When switching element 25 is on, primary-side winding 24A of transformer 23 charges. When switching element 25 is off, secondary-side winding 24B and auxiliary winding 24C of transformer 23 discharge. In response to the feedback voltage $V_{FB}$ generated by auxiliary winding 24C reaching a knee point voltage $V_{KNEE}$, controller 12 may turn-on switching element 25 in order to recharge primary-side winding 24A. In some examples, controller 12 may turn-on switching element 25 at a different time. In other words, controller 12 may turn-on switching element 25 before or after the feedback voltage $V_{FB}$ is equal to the knee point voltage $V_{KNEE}$.

In the example of FIG. 2, controller 12 includes knee point detector 20 to determine when the feedback voltage $V_{FB}$ reaches knee point voltage $V_{KNEE}$. As is described below with respect to FIGS. 3-6, knee point detector 20 of controller 12 may determine when the resistor divided feedback voltage $V_{FB}$ of auxiliary winding 24C reaches the knee point voltage $V_{KNEE}$ for a first switching cycle. By determining when feedback voltage $V_{FB}$ reaches the knee point $V_{KNEE}$, knee point detector 20 may predict when the feedback voltage will reach the knee point voltage $V_{KNEE}$ for a second switching cycle.

In some examples, knee point detector 20 may determine when the feedback voltage $V_{FB}$ reaches the knee point $V_{KNEE}$ in response to charging and discharging an internal capacitor (e.g., the internal capacitor may be internal to knee point detector 20). For example, knee point detector 20 may charge the internal capacitor as the primary-side winding 24A charges. Knee point detector 20 may apply a discharge current to the internal capacitor, where the discharge current is indicative of an expected amount of time to discharge the secondary-side winding 24B and the auxiliary winding 24C to the knee point voltage $V_{KNEE}$. Knee point detector 20 may monitor the internal capacitor voltage as the internal capacitor discharges. In response to determining that the internal capacitor has discharged to a reference voltage $V_{REF}$, knee point detector 20 determine whether the discharge time of the internal capacitor matches the discharge time of secondary-side winding 24B for a first switching cycle, and hence may determine a discharge time associated with the knee point voltage $V_{KNEE}$ for the first switching cycle. In other words, knee point detector 20 may determine whether the secondary-side winding 24B and auxiliary winding 24C discharged from a peak voltage to the knee point voltage faster, slower, or in the same amount of time as the internal capacitor discharged from a peak voltage to a reference voltage $V_{REF}$. Knee point detector may predict, based at least in part on the discharge time to reach knee point voltage $V_{KNEE}$ for the first switching cycle, an expected amount of time to reach the knee point voltage $V_{KNEE}$ for a second switching cycle. By more accurately predicting the discharge time of the secondary-side winding, and hence the time when the knee point voltage will occur, knee point detector may more accurately determine when to turn-on switching element 25.

Figure 3:
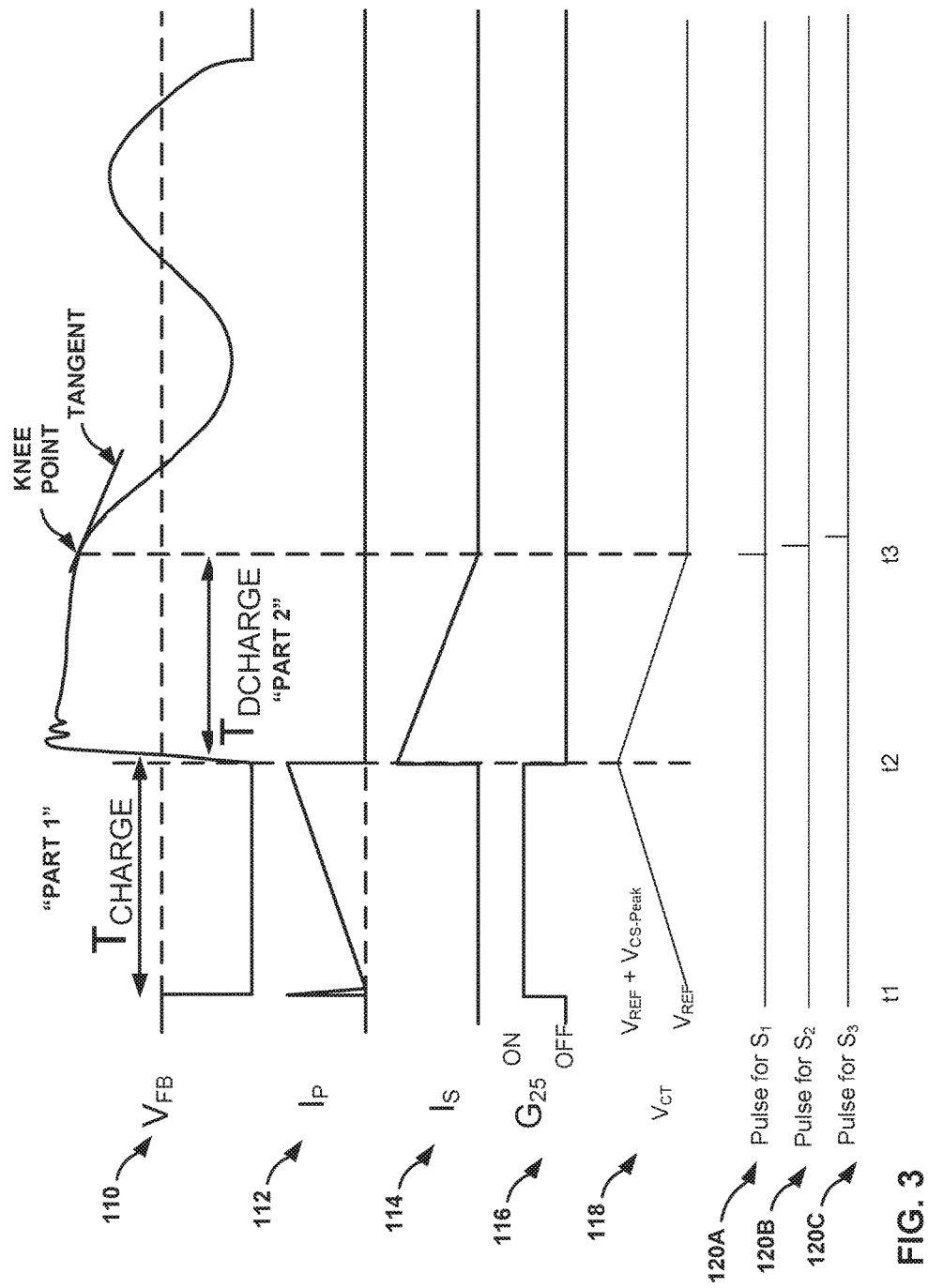
FIG. 3 is a timing diagram illustrating various electrical characteristics of the example power converter shown in FIG. 2, in accordance with one or more aspects of the present disclosure.

FIG. 3 is a timing diagram illustrating various electrical characteristics of the example power converter shown in FIG. 2, in accordance with one or more aspects of the present disclosure. FIG. 3 is described below in the context of converter 6 of FIG. 2. In particular, waveforms 110-116 of FIG. 3 represent some of the typical wave forms of a discontinues-mode (DCM) flyback topology.

Waveform 110 corresponds to feedback voltage $V_{FB}$, which is a resistor divided voltage of auxiliary winding 24C that is output by voltage divider 42 between times t1 and t3. Waveforms 112 and 114 correspond, respectively, to the primary-side current $I_P$ running through primary-side winding 24A and the secondary-side current $I_S$ running through secondary-side winding 24B between times t1 and t3. Waveform 116 corresponds to the gate control signal $G_{25}$ applied to switching element 25 between times t1 and t3. The amount of time between times t1 and t3 may be referred to as one switching cycle. In other words, during one switching cycle, gate control signal G25 may cause switching element 25 to turn-on once and turn-off once.

As will be described in more detail with reference to FIG. 4, waveform 118 corresponds to a voltage $V_{CT}$ over an internal capacitor (e.g., a capacitor internal to controller 12)

between times t1 and t3. As will also be described in more detail with reference to FIG. 4, waveforms 120A-120C (collectively, "waveforms 120") correspond to three respective pulses generated by controller 12 to sample feedback voltage $V_{FB}$ at approximately time t3.

While operating power converter 6 in DCM, at time t1, controller 12 may generate a gate signal across link 16 that causes the MOSFET of switching element 25 to turn-on and, as a result, causes a current $I_P$ to travel from source 2, via link 8, through primary winding 24A. When switching element 25 is switched-on according to the gate control signal supplied by controller 12, the current $I_P$ through primary-side winding 24A ramps up between times t1 and t2 (time $T_{CHARGE}$ or "$T_{ON}$") with a slope of $V_{IN}/L_P$. The energy stored in the core of transformer 23 at the end of $T_{ON}$ cycle at time t2 is proportional to $\frac{1}{2} \times L_P \times I_{P-PEAK}^2$, where $L_P$ is the inductance of primary-side winding 24A and $I_{P-PEAK}$ is the peak current of primary-side winding 24A. The current $I_S$ at secondary-side winding 24B is zero between times t1 and t2 during the $T_{CHARGE}$ or $T_{ON}$ phase. In addition, during the $T_{CHARGE}$ or $T_{ON}$ phase between times t1 and t2, the voltage $V_S$ across secondary-side winding 24B is negative (also referred to as the secondary-side ground) and is equal to $-N_S \times V_{IN}$, where $N_S$ is the transformer secondary/primary turn ratio.

At time t2, controller 12 may generate a different gate signal that causes switching element 25 to turn-off and, as a result, inhibits current $I_P$ from traveling from source 2, via link 8, through primary winding 24A. When switching element 25 switches off, the current $I_P$ becomes zero and the current $I_S$ through secondary-side winding 24B ramps down, or discharges, from the value $I_{S-PEAK}$ (which is equal to $I_{P-PEAK}/N_S$) to zero with a slope of approximately $\sim(V_{OUT} + V_{DOUT})/L_S$ (where $V_{OUT}$ is secondary-side output voltage across output capacitor 30 and $V_{DOUT}$ is the forward voltage drop across diode 41).

Between times t2 and t3, while the current $I_S$ at secondary-side winding 24B is still greater than zero and switching element 25 is switched-off, the output voltage $V_{OUT}$ is reflected back to primary-side winding 24A according to the transformer turn ratio. The output voltage $V_{OUT}$ is similarly reflected back to auxiliary winding 24C as the resistor divided feedback voltage $V_{FB}$ of auxiliary winding 24C. Said differently, after switching element 25 is switched-off at time t2, the energy stored at transformer 23 during the magnetized period is delivered to secondary-side winding 24B (with a quantity of $N_S$ windings) and auxiliary winding 24C (with a quantity of $N_A$ windings) as shown in EQ. 1.

$$V_{AUX} = \frac{N_A}{N_S} * (V_{DOUT} + V_{OUT}) \qquad \text{Equation 1}$$

Voltage divider 42, which is formed by resistors R2 and R3 across auxiliary winding 24C, outputs the resistor divided feedback voltage $V_{FB}$ of auxiliary winding 24C to controller 12. Controller 12 uses the resistor divided feedback voltage $V_{FB}$ of auxiliary winding 24C for determining $V_{OUT}$, as shown below in EQ. 2.

$$V_{FB} = \frac{R_3}{R_2 + R_3} * \frac{N_A}{N_S} * (V_D + V_{OUT}) \qquad \text{Equation 2}$$

In order to more precisely detect the output voltage $V_{OUT}$ of power converter 6, the resistor divided feedback voltage $V_{FB}$ of auxiliary winding 24C should be measured at time t3, after the current $I_S$ at secondary-side winding 24B decreases to zero. Therefore, the variation of the forward voltage ($V_{DOUT}$) of diode 41 can be neglected. Controller 12 may determine the resistor divided feedback voltage $V_{FB}$ of auxiliary winding 24C as shown in EQ. 3:

$$V_{FB} = \frac{R_3}{R_2 + R_3} * \frac{N_A}{N_S} * (V_{OUT}) \qquad \text{Equation 3}$$

When the current $I_S$ at secondary-side winding 24B decreases to zero, the resistor divided feedback voltage $V_{FB}$ of auxiliary winding 24C reaches knee point voltage $V_{KNEE}$. At time t3, when the voltage at auxiliary winding 24C will be at knee point voltage $V_{KNEE}$ and the current $I_S$ at secondary-side winding 24B reaches zero, transformer windings 24A, 24B, and 24C become open and the resistor divided feedback voltage $V_{FB}$ of auxiliary winding 24C converts to a damped ringing waveform fueled by residual energy in the $L_P$ and $C_d$ resonant circuit (where $C_d$ is the total equivalent capacitance at the drain of switching element 25). Accordingly, controller 12 may determine that when the resistor divided feedback voltage $V_{FB}$ of auxiliary winding 24C reflects the knee point voltage $V_{KNEE}$, such as at time t3, that the duration $T_{DCHARGE}$ has ended. In other words, when the feedback voltage $V_{FB}$ reaches the knee point voltage $V_{KNEE}$, secondary-side winding 24C and auxiliary winding 24B will be discharged. Thus, when auxiliary winding 24C has discharged and $V_{FB}$ is equal to the knee point voltage $V_{KNEE}$, controller 12 may determine that $V_{OUT}$ may be too low for load 4 and that controller 12 should switch switching element 25 back on in order to re-charge transformer 23. Controller 12 may vary the duty cycle of switching element 25 in response to detecting the knee point voltage $V_{KNEE}$ associated with the resistor divided feedback voltage $V_{FB}$ of auxiliary winding 24C. In other words, controller 12 may turn-on switching element 25 when the feedback voltage $V_{FB}$ reaches the knee point voltage $V_{KNEE}$ in order to keep the output voltage $V_{OUT}$ constant over changing load and changing input voltage $V_{IN}$ conditions.

In accordance with the techniques of this disclosure, controller 12 of FIG. 2 may determine the discharge time of secondary-side winding 24B for a first switching cycle based on a feedback voltage generated by auxiliary winding 24C. In response to determining the discharge time for the first switching cycle, controller 12 may predict the discharge time of secondary-side winding 24B (and thus the discharge time of auxiliary winding 24C) for the second switching cycle based at least in part on the discharge time for the first switching cycle. For instance, as shown by equations 4-11, the discharge time of the auxiliary winding 24C and secondary-side winding 24B for second switching cycle ($T_{DCHARGE(n+1)}$) may be a function of the discharge time of the auxiliary winding 24C and secondary-side winding 24B for the first switch cycle ($T_{DCHARGE(n)}$).

In DCM operation, the discharge time of secondary-side winding 24B is based on the maximum or "peak" level of current of secondary-side winding 24B ($I_{S-Peak}$), which is proportional to the peak level of current of primary-side winding 24A ($I_{P-Peak}$). The peak level of current of primary-side winding 24A ($I_{P-PEAK}$) is achieved when switching element 25 is switched-on for an amount of time ($T_{ON}$). For example, the peak primary-side current may be calculated as follows:

$$I_{P-PEAK} = \frac{V_{IN}}{L_P} * T_{ON} \qquad \text{Equation 4}$$

where ($L_P$) is the inductance of primary-side winding 24A and ($V_{IN}$) is the primary-side input voltage from source 2. Similarly, the peak level of current of secondary-side winding 24B ($I_{S-PEAK}$) is achieved when switching element 25 is switched-off and may be calculated as follows:

$$I_{S-PEAK} = \frac{N_P}{N_S} * I_{P-PEAK} \qquad \text{Equation 5}$$

where ($I_{P-PEAK}$) is the peak current of primary-side winding 24A, ($N_P$) represents the number of turns associated with primary-side winding 24A, and ($N_S$) is the number of turns at secondary-side winding 24B.

In some examples, the peak level of current through secondary-side winding 24B ($I_{S-PEAK}$) is a function of the output voltage ($V_{OUT}$), the forward voltage of diode D ($V_{DOUT}$), the inductance of secondary-side winding 24B ($L_S$), and an amount of time ($T_{DCHARGE}$) that secondary-side winding 24B takes to demagnetize. For example, the peak level of current through secondary-side winding 24B ($I_{S-PEAK}$) may be calculated as follows:

$$I_{S-PEAK} = \frac{V_{OUT} + V_{DOUT}}{L_S} * T_{DCHARGE}. \qquad \text{Equation 6}$$

Accordingly, substituting the terms of EQ. 5 with respective, equivalent terms of EQ. 6, yields EQ. 7.

$$\frac{N_P}{N_S} * I_{P-PEAK} = \frac{V_{OUT} + V_{DOUT}}{L_S} * T_{DCHARGE} \qquad \text{Equation 7}$$

Re-arranging EQ. 7 to solve for the discharge time ($T_{DCHARGE}$) yields EQ. 8.

$$T_{DCHARGE} = \frac{N_P}{N_S} * I_{P-PEAK} * \frac{L_S}{V_{OUT} + V_{DOUT}}. \qquad \text{Equation 8}$$

When the current through secondary-side winding 24B drops to zero, $V_{DOUT}$ is negligible and may be disregarded. Further, using Ohm's law, the peak current on the primary side ($I_{P-PEAK}$) may be written as $I_{P-PEAK} = V_{CS-PEAK}/R_{CS}$. Thus, the discharge time $T_{DCHARGE}$ for any given switching cycle can be re-written as follows:

$$T_{DCHARGE} = \frac{N_P}{N_S} * \frac{V_{CS}}{R_{CS}} * \frac{L_S}{V_{OUT}}. \qquad \text{Equation 9}$$

Dividing by two consecutive switching cycles can be shown by following equation:

$$\frac{T_{DCHARGE}(n+1) = \frac{N_P}{N_S} * \frac{V_{CS}(n+1)}{R_{CS}} * \frac{L_S}{V_{OUT}}}{T_{DCHARGE}(n) = \frac{N_P}{N_S} * \frac{V_{CS}(n)}{R_{CS}} * \frac{L_S}{V_{OUT}}} \qquad \text{Equation 10}$$

where $T_{DCHARGE}$ (n) is the discharge time during the $n^{th}$ switching cycle, $V_{CS-PEAK}$ (n) is the peak voltage during $n^{th}$ switching cycle, $T_{DCHARGE}$ (n+1) is the estimated discharge time during the (n+1)$^{th}$ switching cycle, and $V_{CS-PEAK}$ (n+1) is the peak voltage during (n+1)$^{th}$ switching cycle.

Assuming $V_{OUT}$ is constant, and re-arranging Equation 10 to solve for $T_{DCHARGE}$ (n+1) yields the following equation:

$$T_{DCHARGE}(n+1) = \frac{V_{CS}(n+1)}{V_{CS}(n)} * T_{DCHARGE}(n) \qquad \text{Equation 11}$$

Thus, as shown in equation 11, the discharge time $T_{DCHARGE}$ for the (n+1)$^{th}$ switching cycle may depend on the discharge time $T_{DCHARGE}$ during the $n^{th}$ switching cycle. In some examples, the discharge time $T_{DCHARGE}$ for the (n+1)$^{th}$ switching cycle may also depend on the peak voltage $V_{CS}$ during the (n+1)$^{th}$ switching cycle and the peak voltage $V_{CS}$ during the $n^{th}$ switching cycle. As described in more detail in FIG. 4, knee point detector 20 of controller 20 may determine the discharge time $T_{DCHARGE(n)}$ for a first switching cycle (n) and may predict the discharge time $T_{DCHARGE(n+1)}$ for the second switching cycle (n+1) based at least in part on the discharge time for the first switching cycle.

Figure 4:
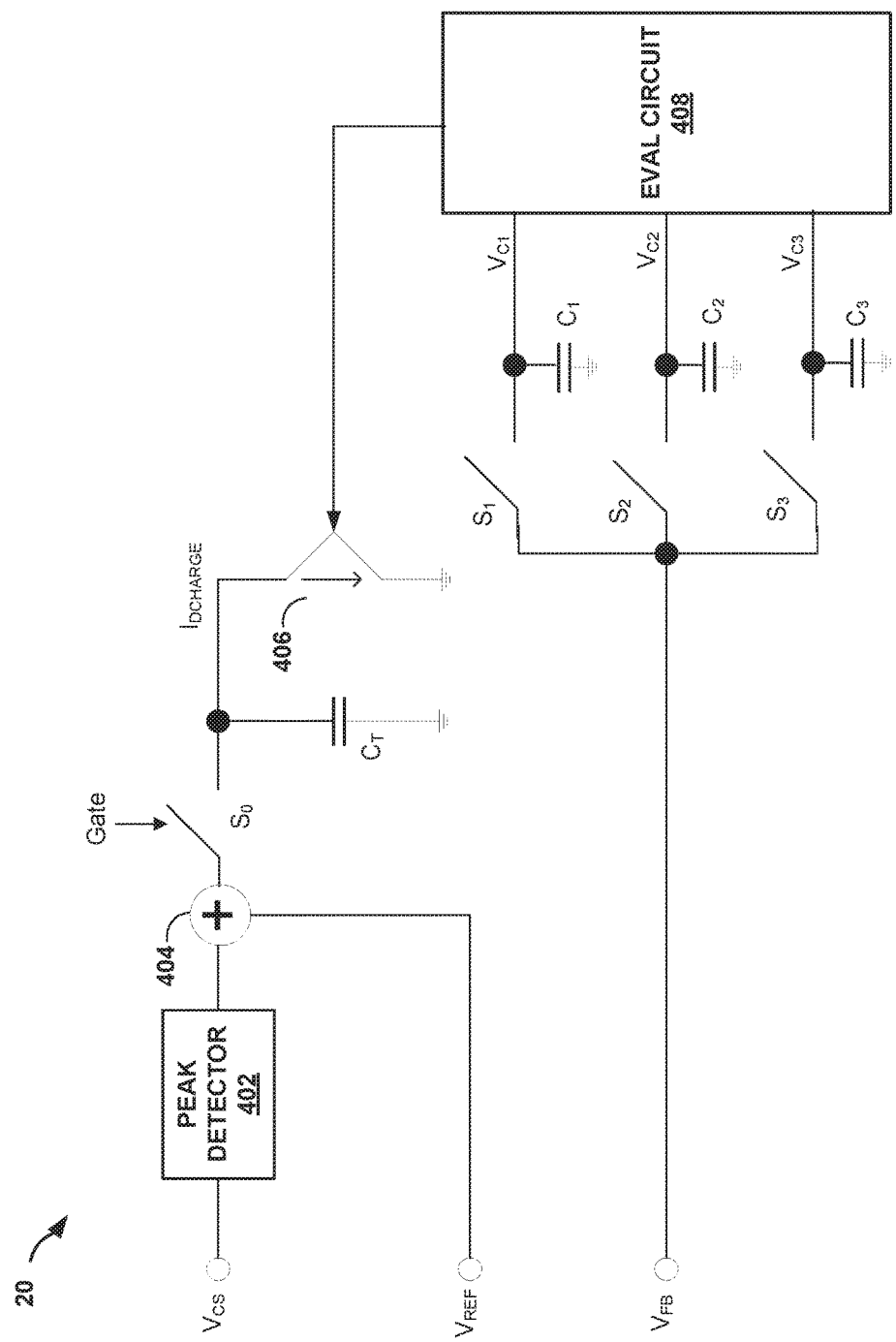
FIG. 4 is a conceptual diagram illustrating an example knee point detector of the example controller of FIG. 2.

FIG. 4 is a conceptual diagram illustrating an example knee point detector 20 of the example controller of FIG. 2. Knee point voltage detector 20 of FIG. 4 is described below in the context of FIGS. 1-3. In some examples, knee point detector 20 may include peak detector 402, voltage adder 404, current source 406, evaluation circuit 408, capacitors $C_T$, $C_1$, $C_2$, $C_3$, and switches $S_0$, $S_1$, $S_2$, and $S_3$. In other examples, knee point detector 20 may include components not shown in FIG. 4 and/or may not include components shown in FIG. 4.

Knee point detector 20 receives the resistor divided feedback voltage $V_{FB}$ of auxiliary winding 24C, common source voltage $V_{CS}$, reference voltage $V_{REF}$ (e.g., a reference voltage internal to knee point detector 20), and a gate control signal associated with switching element 25 as inputs. Peak detector 402 receives the common source voltage $V_{CS}$, detects the peak voltage $V_{CS-PEAK}$, and holds the peak voltage $V_{CS}$.

At time t1 (as shown in FIG. 3), controller 12 may output a gate control signal $G_{25}$, which may cause switching element 25 to turn-on and switch $S_0$ to close. When switch $S_0$ is closed, voltage adder 404 may add voltage $V_{CS}$ and reference voltage $V_{REF}$, such that when switch $S_0$ is closed, capacitor $C_T$ may be charged to the combined voltage $V_{CS-PEAK}+V_{REF}$. Thus, knee point detector 20 may charge capacitor $C_T$ based on the peak voltage $V_{CS-PEAK}$ applied to the primary side winding 24A during time t1. In other words, as shown by waveform 118 in FIG. 3, the voltage Vcr over capacitor $C_T$ may increase from $V_{REF}$ to $V_{CS-PEAK}+V_{REF}$ when switch $S_0$ is closed.

At time t2, knee point detector 20 may cause switching element 25 to turn-off and cause switch $S_0$ to open. In response to opening switch $S_0$, current source 406 may apply a discharge current defined by a first amount of current to capacitor $C_T$ in order to discharge capacitor $C_T$. Knee point detector 20 may monitor the voltage $V_{CT}$ across internal capacitor $C_T$ as capacitor $C_T$ discharges. At time t3, knee point detector 20 may determine that the voltage $V_{CT}$ across capacitor $C_T$ has decreased from the combined voltage $V_{CS-PEAK} + V_{REF}$ back to $V_{REF}$.

Responsive to determining that the voltage over capacitor $C_T$ has decreased to $V_{REF}$, knee point detector 20 may determine whether the discharge time of capacitor $C_T$ is equal to the discharge time of secondary-side winding 24B and auxiliary winding 24C. In some examples, knee point detector 20 may determine whether the capacitor discharge time is equal to the discharge time of secondary-side winding 24B by sampling feedback voltage $V_{FB}$ a plurality of times and compare the plurality of sampled voltages to one another. For example, knee point detector 20 may sample feedback voltage $V_{FB}$ by generating a plurality of respective pulses to control switches $S_1$-$S_3$. Knee point detector 20 may sample $V_{FB}$ a first time by sending a first pulse to switch $S_1$, which may cause switch $S_1$ to close and may cause capacitor $C_1$ to hold a first sampled feedback voltage $V_{C1}$. After sampling $V_{FB}$ a first time, knee point detector 20 may re-open switch $S_1$. Knee point detector 20 may send a second pulse to switch $S_2$ in order to close switch $S_2$ and sample $V_{FB}$ a second time. When switch $S_2$ is closed, capacitor $C_2$ may hold the second sampled voltage $V_{C2}$. After sampling $V_{FB}$ a second time, knee point detector 20 may re-open switch $S_2$. Knee point detector 20 may sample $V_{FB}$ a third time by sending a third pulse to switch $S_3$, which may cause switch $S_3$ to close and may cause capacitor $C_3$ to hold a third sampled feedback voltage $V_{C3}$. Thus, knee point detector 20 may sample feedback voltage $V_{FB}$ three times in succession and capacitors $C_1$-$C_3$ may simultaneously hold the three sampled voltages $V_{C1}$-$V_{C3}$.

Responsive to sampling $V_{FB}$ a plurality of times, evaluation circuit 408 may compare the sampled voltages $V_{C1}$, $V_{C2}$, and $V_{C3}$ to one another. For example, evaluation circuit 408 may calculate the difference between the first held voltage $V_{C1}$ and the second held voltage $V_{C2}$ and/or the difference between the second held voltage $V_{C2}$ and the third held voltage $V_{C3}$.

As will be described in more detail with reference to FIGS. 5A-5C, in some examples, evaluation circuit 408 may compare the difference between the first held voltage $V_{C1}$ and the second held voltage $V_{C2}$ to a first threshold voltage difference and may compare the difference between the second held voltage $V_{C2}$ and the third held voltage $V_{C3}$ to a second threshold voltage difference. The first threshold difference may be the same as the second threshold difference, or may be different from the second threshold difference. In some examples, the first and second threshold voltage differences may be a fixed value (e.g., 1 milli-volt). However, the first and second threshold voltage differences may be variable.

Evaluation circuit 408 may determine that the discharge time of the internal capacitor $C_T$ is not equal to the discharge time of secondary-side winding 24B, which may indicate that that the internal capacitor discharged faster or slower than the secondary-side winding discharged from the peak voltage to the knee point voltage $V_{KNEE}$. In some examples, evaluation circuit 408 may make the determination based on the comparison of the differences between the held voltages and the threshold voltage differences. In response to determining that the discharge time of the internal capacitor $C_T$ is not equal to the discharge time of secondary-side winding 24B, evaluation circuit 404 may cause current source 406 to change (e.g., increase or decrease) the discharge current for the next switching cycle. In other words, if the discharge time of capacitor $C_T$ is not equal to the discharge time of secondary side winding 24B, current source 406 may change from the first amount of current to a second amount of current in order to change the discharge time of internal capacitor $C_T$ during the next switching cycle. For example, evaluation circuit 408 may predict the discharge time of the $(n+1)^{th}$ switching cycle based on the discharge time of the current $(n^{th})$ switching cycle, the peak voltage $V_{CS-PEAK}$ of the current $(n^{th})$ switching cycle, and the peak voltage $V_{CS-PEAK}$ of the next $(n+1)^{th}$ switching cycle. Thus, in response to predicting the discharge time for the $(n+1)^{th}$ switching cycle, evaluation circuit 408 may adjust the current output by current source 406 in the $(n+1)^{th}$ switching cycle to adjust the discharge time of the internal capacitor CT during the $(n+1)^{th}$ switching cycle to match the predicted discharge time.

At the start of the second switching cycle, controller 12 may cause switching element 25 and switch $S_0$ to close, which may re-charge primary-side winding 24A to peak voltage $V_{CS-PEAK}$ and internal capacitor $C_T$ to $V_{REF}+V_{CS-PEAK}$. After charging capacitor $C_T$ to the summed voltage $V_{REF}+V_{CS-PEAK}$, controller 12 may open switching element 25 and switch $S_0$. Responsive to opening switching element 25 and switch $S_0$, current source 406 of knee point detector 20 may apply the current defined by the second current amount to internal capacitor $C_T$, which may discharge internal capacitor $C_T$. As described above, the second amount of current may be based on the predicted discharge time of the secondary-side winding 24B and auxiliary winding 24C. In other words, knee point detector 20 may set the current to the second amount of current such that capacitor $C_T$ will be discharged at the same time that knee point detector 20 predicted the feedback voltage $V_{FB}$ will reach the knee point voltage $V_{KNEE}$.

Knee point detector 20 may monitor the voltage $V_{CT}$ of the internal capacitor. In response to detecting that the voltage $V_{CT}$ of the internal capacitor has dropped to the reference voltage $V_{REF}$, knee point detector 20 may again sample the feedback voltage $V_{FB}$. For example, knee point detector 20 may output three more pulses to switches $S_1$-$S_3$, respectively. In this way, knee point detector 20 may sample and hold three voltages $V_{C1}$-$V_{C3}$. Evaluation unit 408 may determine, based on the held voltage $V_{C1}$-$V_{C3}$, whether the predicted discharge time of secondary-side winding 24B and auxiliary winding 24C is equal to the actual discharge time of secondary-side winding 24B and auxiliary winding 24, which may indicate whether knee point detector 20 accurately predicted the amount of time for the feedback voltage $V_{FB}$ to reach the knee point voltage $V_{KNEE}$. Evaluation circuit 408 may determine a third amount of current using the same process as used to determine the second amount of current, and may adjust the discharge current to the third amount of current accordingly. Controller 12 may continue this cycle of charging the internal capacitor, applying a discharge current to discharge the internal capacitor, sampling the feedback voltage, and predicting the discharge time of the next cycle, and adjusting the discharge current for the next switching cycle. In this way, controller 12 determine whether the predicted discharge time of the secondary-side winding 24B is equal to the actual discharge time of the secondary-side winding 24B, and more accurately predict the discharge time of the secondary-side winding 24B for the next switching cycle.

Figure 5A:
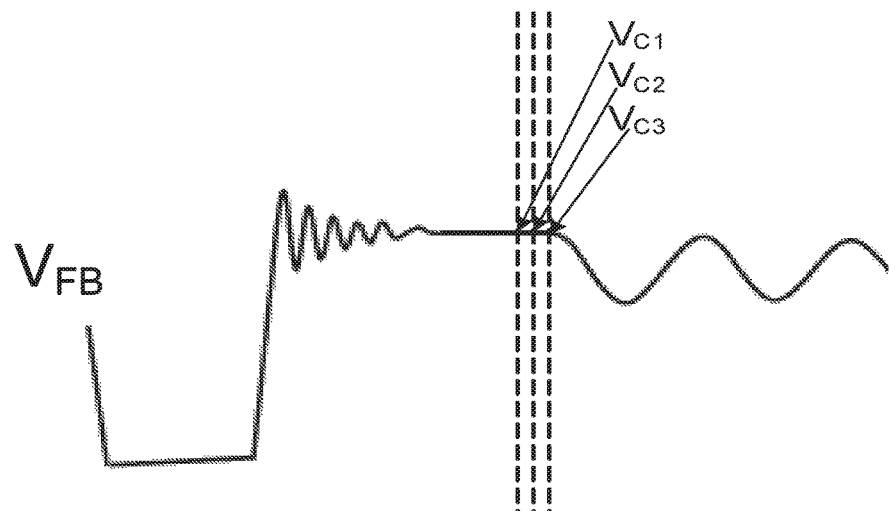
FIGS. 5A-5C are timing diagrams illustrating example waveforms of a feedback voltage received by the example knee point detector shown in FIG. 4, in accordance with one or more aspects of the present disclosure.
Figure 5B:
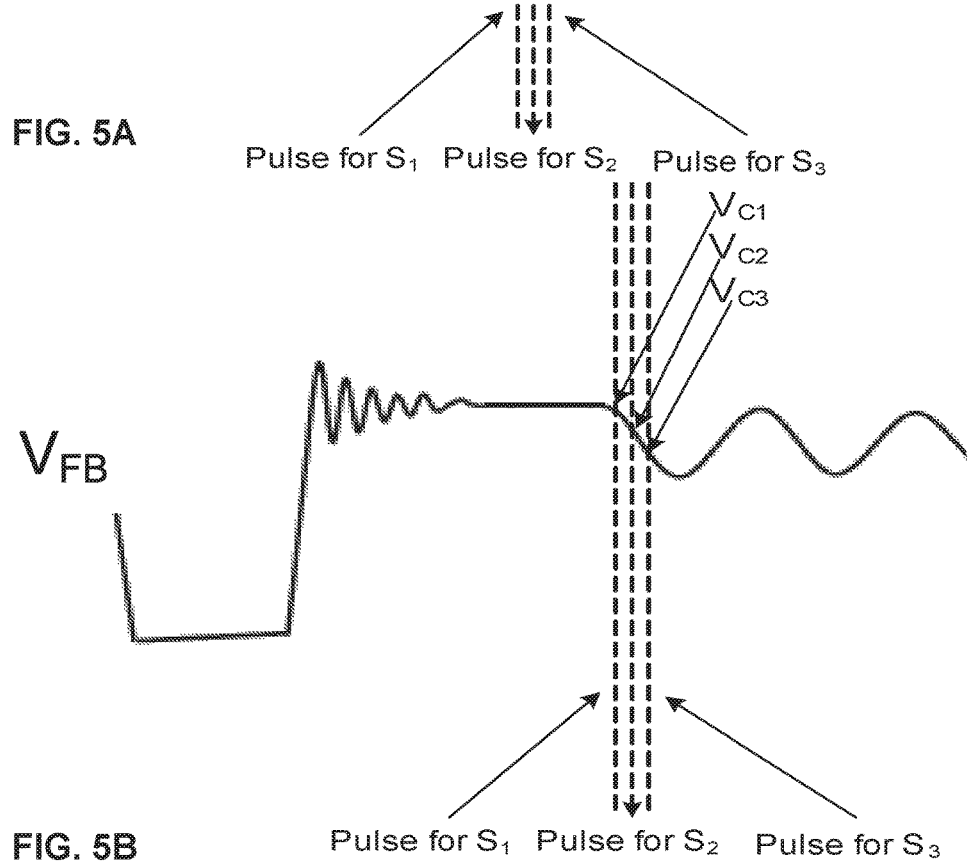
Figure 5C:
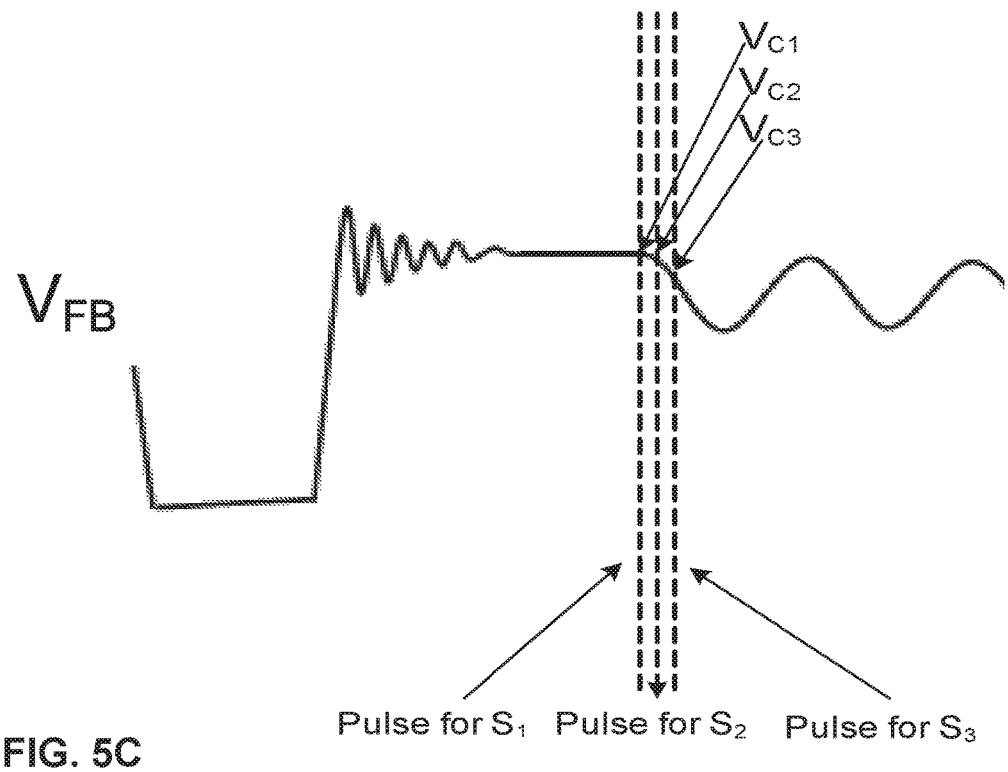

FIGS. 5A-5C are timing diagrams illustrating a feedback voltage received by the example knee point detector in example scenarios. FIG. 5 is described below in the context of knee point detector 20 of converter 6 of FIGS. 2 and 4.

As described with reference to FIG. 4, when knee point detector 20 determines that $V_{CT}$ has discharged to the reference voltage $V_{REF}$, knee point detector 20 may generate a plurality of pulses at close intervals to sample and hold the feedback voltage $V_{FB}$. For example, knee point detector 20 may generate three separate pulses to capacitors $C_1$, $C_2$, and $C_3$, respectively. As a result, capacitors $C_1$-$C_3$ may respectively hold voltages $V_{C1}$-$V_{C3}$, which may indicate the voltage level of feedback voltage $V_{REF}$ at three distinct times. Evaluation circuit 408 may determine a first difference between the first held voltage $V_{C1}$ and the second held voltage $V_{C2}$, and a second difference between the second held voltage $V_{C2}$ and the third held voltage $V_{C3}$. Evaluation circuit 408 may compare the first voltage difference to a first threshold difference and the second voltage difference to a second threshold difference in order to determine whether the discharge time of the internal capacitor $C_T$ is equal to the discharge time of the secondary-side winding 24B (and auxiliary winding 24C).

As illustrated in FIG. 5A, evaluation circuit 408 may determine that the first voltage difference does not satisfy (e.g., is less than) a first threshold difference and the second voltage difference does not satisfy a second threshold difference. For instance, as illustrated in FIG. 5A, the feedback voltage $V_{FB}$ remains relatively flat at all three sampled voltages $V_{C1}$, $V_{C2}$, and $V_{C3}$, which may indicate that capacitor $C_T$ discharged before the secondary-side winding 24B discharged and that the feedback voltage $V_{FB}$ had not yet hit the knee point voltage. Responsive to determining that the first voltage difference does not satisfy a threshold difference and that the second voltage difference does not satisfy a threshold difference, evaluation circuit 408 may cause current source 406 to decrease the discharge current during the next switching cycle.

In some examples, evaluation circuit 408 may adjust the discharge current by a fixed amount. For example, evaluation circuit 408 may decrease the discharge current by a predetermined amperage (e.g., 0.1 microamps (μA)). In some examples, evaluation circuit may adjust the discharge current by a variable amount. For instance, evaluation circuit 408 may determine the current adjustment to use for the second switching cycle based on the first peak current during the first switching cycle, the second peak current during the second switching cycle, and the discharge time for the first switching cycle, in accordance with equation 11. Thus, in some instances, evaluation circuit 408 may determine how much to adjust the current and may decrease the current accordingly. Decreasing the amount of the discharge current may increase the discharge time of $C_T$. By increasing the discharge time of capacitor $C_T$, controller 12 may cause the discharge time of capacitor $C_T$ to more closely match the discharge time of secondary-side winding 24B. By more closely matching the discharge time of capacitor $C_T$ and the discharge time of secondary-side winding 24B, controller 12 may more accurately predict the amount of time for the feedback voltage to reach the knee point voltage and may more accurately determine when to turn-on switching element 25 to recharge primary-side winding 24A.

Evaluation circuit 408 may determine, as illustrated in FIG. 5B, that the first voltage difference satisfies (e.g., is greater than or equal to) a first threshold difference and the second voltage difference satisfies a second threshold difference. For instance, as illustrated in FIG. 5B, the feedback voltage $V_{FB}$ has already passed the knee point and has entered the damped ringing waveform prior to obtaining the first sampled voltage $V_{C1}$. Responsive to determining that the first voltage difference satisfies a threshold difference and that the second voltage difference satisfies a threshold difference, evaluation circuit 408 may cause current source 406 to increase the discharge current during the next switching cycle. As described above, evaluation circuit 408 may adjust the amount of the discharge current by a fixed amount. In some examples, evaluation circuit 408 may adjust the discharge current by a variable amount (e.g., according to equation 11). In other words, evaluation circuit 408 may increase the current by a fixed amount or a variable amount. By increasing the discharge current, evaluation circuit 408 may decrease the discharge time of $C_T$. By decreasing the discharge time of capacitor $C_T$, controller 12 may cause the discharge time of capacitor $C_T$ to more closely match the discharge time of secondary-side winding 24B. By more closely matching the discharge time of capacitor $C_T$ and the discharge time of secondary-side winding 24B, controller 12 may more accurately predict the time it will take for the feedback voltage to reach the knee point voltage for the next switching cycle.

As illustrated in FIG. 5C, evaluation circuit 408 may determine that the first voltage difference does not satisfy (e.g., is less than) a threshold difference and the second voltage difference satisfies (e.g., is greater than) a threshold difference. For instance, as illustrated in FIG. 5C, the waveform for feedback voltage $V_{FB}$ remains relatively flat at the first sampled voltage $V_{C1}$, but the waveform has started to enter the damped ringing waveform at the second sampled voltage $V_{C2}$, and continues as a damped ringing waveform at the third sampled voltage $V_{C3}$. In these examples, evaluation circuit 408 may determine that $V_{C2}$ corresponds to the knee point and the discharge time of capacitor CT is equal to the discharge time of secondary-side winding 24B. Thus, in response to first voltage determining does not satisfy the threshold voltage difference and the second voltage difference satisfies the threshold voltage difference, evaluation circuit 408 may cause current source 406 to output the same amount of discharge current during the next switching cycle. In other words, because $V_{C2}$ corresponds to the knee point voltage and the discharge time of capacitor $C_T$ is equal to the discharge time of secondary-side winding 24B, controller 12 may turn-on switching element 25 at the knee point voltage in order to recharge primary-side winding 24A.

Figure 6:
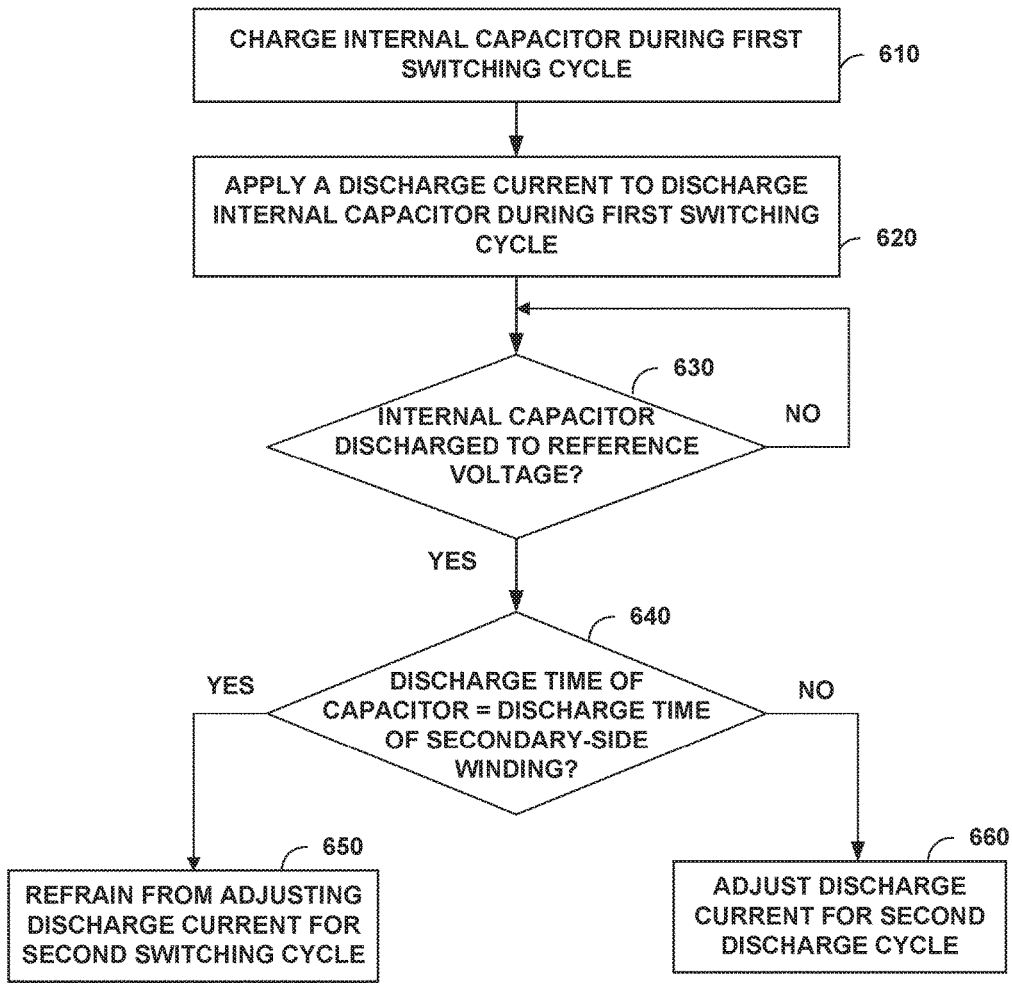
FIG. 6 is a flowchart illustrating an example method for controlling a power converter, in accordance with one or more aspects of this disclosure.

FIG. 6 is a flowchart illustrating an example method for controlling a power converter, in accordance with one or more aspects of this disclosure. For purposes of illustration only, the example operations are described below within the context of FIGS. 1-5.

Controller 12 may charge an internal capacitor $C_T$ based on a peak voltage applied to the primary-side winding (610). For example, controller 12 may sum a peak voltage $V_{CS\text{-}PEAK}$ and a reference voltage $V_{REF}$ and may close switch $S_0$ such that capacitor CT is charged to the sum of $V_{CS\text{-}PEAK}$+$V_{REF}$. The peak voltage $V_{CS\text{-}PEAK}$ may be equal to peak voltage applied to the primary-side winding 24A of transformer 23B. After charging the capacitor, controller 12 may apply a discharge current defined by a first amount of current to the capacitor $C_T$ (620). For example, controller 406 may open switch $S_0$ and current source 406 of controller 12 may apply a discharge current to capacitor $C_T$ to discharge capacitor $C_T$.

In some examples, controller 12 determines whether the capacitor $C_T$ has discharged to a reference voltage $V_{REF}$ (630). In other words, controller 12 may monitor the voltage across capacitor $C_T$ to determine whether the voltage has decreases from the maximum voltage (e.g., $V_{CS\text{-}PEAK}$+

$V_{REF}$) to reference voltage $V_{REF}$. In response to determining that the internal capacitor $C_T$ has not discharged to reference voltage $V_{REF}$, controller 12 may continue to monitor the voltage across internal capacitor $C_T$ ("NO" decision of block 630).

Responsive to determining that capacitor $C_T$ has discharged to reference voltage level $V_{REF}$ ("Yes" decision of block 630), controller 12 may determine whether a discharge time of the capacitor $C_T$ is equal to a discharge time of the secondary-side winding 24B (640). In some examples, controller 12 may make the determination based on a feedback voltage $V_{FB}$ generated by the primary-side auxiliary winding 24C. For example, controller 12 may sample and hold the feedback voltage $V_{FB}$ a plurality of times. Controller 12 may sample feedback voltage $V_{FB}$ a plurality of times by generating a plurality of pulses, where each pulse causes a respective switch to close and a respective capacitor to hold the sampled feedback voltage. For instance, knee point detector 20 of controller 12 may include three switches $S_1$-$S_3$ and three capacitors $C_1$-$C_3$. Controller 12 may generate a first pulse to cause switch $S_1$ to close and capacitor $C_1$ to hold a first voltage $V_{C1}$, where the first held voltage indicates the feedback voltage $V_{FB}$ at a first time. Controller 12 may generate a second pulse that causes switch $S_2$ to close and capacitor $C_2$ to hold the second voltage $V_{C2}$ that is indicate of the feedback voltage $V_{FB}$ at a second time. At a third time, switch $S_3$ may close in response to a third pulse from controller 12, such that the third capacitor $C_3$ may hold a third voltage indicative of the feedback voltage $V_{FB}$.

Controller 12 may determine a first voltage difference between the first held voltage $V_{C1}$ and the second held voltage $V_{C2}$. Controller 12 may also determine a second voltage difference between the second held voltage $V_{C2}$ and the third held voltage $V_{C3}$. In some examples, controller 12 may determine whether the first voltage difference satisfies (e.g., is greater than) a first threshold voltage and whether the second voltage difference satisfies a second threshold voltage. In some examples, the first threshold voltage may be equal to the second threshold voltage. In other words, controller 12 may compare the first voltage difference and second voltage difference to the same threshold voltage (e.g., 1 mV) or to different threshold voltages (e.g., 1 mV and 1.5 mV).

In some examples, controller 12 may determine that the discharge time of the capacitor $C_T$ is not equal to a discharge time of the secondary-side winding 24B ("No" decision of block 640). For example, controller 12 may determine that the first voltage difference satisfies (e.g., is greater than) the first threshold difference and that the second voltage difference satisfies the second threshold difference. When the first voltage difference satisfies the first threshold voltage and the second voltage difference satisfies the second threshold voltage, this may indicate that secondary-side winding 24B discharged before capacitor $C_T$, such that feedback voltage $V_{FB}$ has entered a damped ringing waveform and has passed the knee point voltage $V_{KNEE}$. As another example, controller 12 may determine that the discharge time of the capacitor $C_T$ is not equal to a discharge time of the secondary-side winding 24B when the first voltage difference does not satisfy (e.g., is less than) the first threshold difference and that the second voltage difference does not satisfy the second threshold difference. When the first voltage difference does not satisfy the first threshold voltage and the second voltage difference does not satisfy the second threshold voltage, this may indicate that capacitor $C_T$ discharged before secondary-side winding 24B, such that feedback voltage $V_{FB}$ is still relatively constant and has not reached the knee point voltage $V_{KNEE}$.

When controller 12 determines that the discharge time of the capacitor $C_T$ is not equal to the discharge time of the secondary-side winding 24B, controller 12 may adjust the discharge current for a second discharge cycle (660). Controller 12 may adjust the discharge current increasing the discharge current when first voltage difference ($V_{C1}$-$V_{C2}$) and the second voltage difference ($V_{C2}$-$V_{C3}$) both satisfy the threshold voltage. Controller 12 may adjust the discharge current decreasing the discharge current when neither the first voltage difference ($V_{C1}$-$V_{C2}$) nor the second voltage difference ($V_{C2}$-$V_{C3}$) satisfy the threshold voltage. In some examples, controller 12 may adjust the discharge current by a fixed amount. In some examples, controller 12 may adjust the discharge current by a variable amount. For example, controller 12 may adjust the discharge current for a second switching cycle based on the discharge time of the secondary-side winding 24B during the first switching cycle, the peak voltage $V_{CS}$ during the first switching cycle, and the peak voltage $V_{CS}$ during the second switching cycle. Controller 12 may adjust the discharge current in order to adjust the amount of time for capacitor $C_T$ to discharge during the second switching cycle, which may enable controller 12 to more accurately predict the amount of time to reach the knee point voltage during the second switching cycle.

Responsive to determining that the discharge time of the capacitor is equal to the discharge time of the secondary-side winding 24B ("Yes" decision of block 640), controller 12 may refrain from adjusting the discharge current (660). When the discharge time of the capacitor is equal to the discharge time of the secondary-side winding 24B, this may indicate that controller 12 accurately predicted when feedback voltage $V_{FB}$ reached the knee point voltage $V_{KNEE}$, such that controller 12 turns-on switching element 25 and power converter 6 recharges transformer 23 to match the power requirements of the load.

The following numbered examples may illustrate one or more aspects of the disclosure:

Example 1

A power converter comprising: a transformer comprising a primary-side winding, a primary-side auxiliary winding, and a secondary-side winding; a switch configured to coupled and de-couple the primary-side winding to and from a voltage source; and a controller circuit comprising a capacitor, wherein the controller circuit is configured to: charge the capacitor based on a peak voltage applied to the primary-side winding; after charging the capacitor, apply a discharge current defined by a first amount of current to the capacitor, responsive to discharging the capacitor to a reference voltage level, determine, based on a feedback voltage generated by the primary-side auxiliary winding, whether a discharge time of the capacitor is equal to a discharge time of the secondary-side winding; and responsive to determining that the discharge time of the capacitor is not equal to the discharge time of the secondary-side winding, adjust the discharge current from the first amount of current to a second amount of current, wherein the second amount of current is indicative of a predicted discharge time of the secondary-side winding.

Example 2

The power converter of example 1, wherein the controller circuit is configured to determine whether the discharge time of the capacitor is equal to the discharge time of the secondary-side winding by at least being configured to: sample the feedback voltage a first time to generate a first held voltage; sample the feedback voltage a second time to generate a second held voltage; and sample the feedback voltage a third time to generate the third held voltage, determine, based on the first held voltage, the second held voltage, and the third held voltage, whether the discharge time of the capacitor is equal to the first discharge time.

Example 3

The power converter of example 2, wherein the controller circuit is configured to adjust the discharge current by at least being configured to: responsive to determining that a first difference between the first held voltage and the second held voltage satisfies a first threshold voltage, and that a second difference between the second held voltage and the third held voltage satisfies a second threshold voltage, increase the discharge current from the first amount of current to a second amount of current that is greater than the first amount of current.

Example 4

The power converter of any combination of examples 2-3, wherein the controller circuit is configured to adjust the discharge current by at least being configured to: responsive to determining that a first difference between the first held voltage and the second held voltage does not satisfy a first threshold voltage, and that a second difference between the second held voltage and the third held voltage does not satisfy a second threshold voltage, decrease the discharge current from the first amount of current to a second amount of current that is less than the first amount of current.

Example 5

The power converter of any combination of examples 2-4, wherein the peak voltage is a first peak voltage, wherein the controller circuit is configured to charge the capacitor to the first peak voltage during a first switching cycle, and wherein the controller circuit is further configured to: charge, during a second switching cycle of the switch, the capacitor based on a second peak voltage applied to the primary-side winding; wherein the controller circuit is configured to adjust the discharge current further based on the first peak voltage and the second peak voltage, wherein the discharge current defined by the second amount of current is indicative of a predicted discharge time of the secondary-side winding during the second switching cycle.

Example 6

The power converter of any combination of examples 2-5, wherein the controller circuit is configured to determine whether the discharge time of the capacitor is equal to the discharge time of the secondary-side winding by at least being configured to: determine that the discharge time of the capacitor is equal to the discharge time of the secondary-side winding in response to determining that: a first difference between the first held voltage and the second held voltage satisfies a first threshold voltage and a second difference between the second held voltage and the third held voltage does not satisfy a second threshold voltage; and determine that the discharge time of the capacitor is not equal to the discharge time of the secondary-side winding in response to determining that: the first difference between the first held voltage and the second held voltage does not satisfy a first threshold voltage; or the second difference between the second held voltage and the third held voltage satisfies a second threshold voltage.

Example 7

The power converter of any combination of examples 2-6, wherein the controller circuit is further configured to refrain from adjusting the discharge current in response to determining that the discharge time of the capacitor is equal to the discharge time of the secondary-side winding.

Example 8

The power converter of any combination of examples 2-7, wherein capacitor is a fourth capacitor, and wherein the controller circuit further comprises: a first capacitor configured to hold the first held voltage; a second capacitor configured to hold the second held voltage; and a third capacitor configured to hold the third held voltage.

Example 9

The power converter of any combination of examples 2-8, wherein the controller circuit further comprises: a peak voltage detector configured to sample and hold the peak voltage applied to the primary-side winding; a voltage summing circuit configured to: sum the peak voltage and a reference voltage; and output the sum of the peak voltage and the reference voltage to charge the capacitor.

Example 10

The power converter of any combination of examples 2-9, wherein the controller circuit further comprises a current source configured to generate the discharge current.

Example 11

A method of controlling a power converter, the method comprising: charging, by a controller of the power converter, based on a peak voltage applied to a primary-side winding of a transformer of the power converter, a capacitor of the power converter; after charging the capacitor, applying, by the controller and to the capacitor, a discharge current defined by a first amount of current; responsive to discharging the capacitor to a reference voltage level, determining, by the controller and based on a feedback voltage generated by a primary-side auxiliary winding of the transformer, whether a discharge time of the capacitor is equal to a discharge time of a secondary-side winding of the transformer; and responsive to determining that the discharge time of the capacitor is not equal to the discharge time of the secondary-side winding, adjusting, by the controller, the discharge current from the first amount of current to a second amount of current, wherein the second amount of current is indicative of a predicted discharge time of a secondary-side winding of the transformer.

Example 12

The method of example 11, wherein determining whether the discharge time of the capacitor is equal to the discharge time of the secondary-side winding comprises: sampling, by the controller, the feedback voltage a first time to generate a first held voltage; sampling, by the controller, the feedback voltage a second time to generate a second held voltage; and sampling, by the controller, the feedback voltage a third time to generate the third held voltage, determining, by the controller, based on the first held voltage, the second held voltage, and the third held voltage, whether the discharge time of the capacitor is equal to the first discharge time.

Example 13

The method of example 12, wherein adjusting the discharge current comprises: responsive to determining that a first difference between the first held voltage and the second held voltage satisfies a first threshold voltage, and that a second difference between the second held voltage and the third held voltage satisfies a second threshold voltage, increasing, by the controller, the discharge current from the first amount of current to a second amount of current that is greater than the first amount of current.

Example 14

The method of any combination of examples 12-13, wherein adjusting the discharge current comprises: responsive to determining that a first difference between the first held voltage and the second held voltage does not satisfy a first threshold voltage, and that a second difference between the second held voltage and the third held voltage does not satisfy a second threshold voltage, decreasing, by the controller, the discharge current from the first amount of current to a second amount of current that is less than the first amount of current.

Example 15

The method of any combination of examples 12-14, wherein the peak voltage is a first peak voltage, and wherein the controller is configured to charge the capacitor to the first peak voltage during a first switching cycle, the method further comprising: charging, by the controller, during a second switching cycle of the switch, the capacitor based on a second peak voltage applied to the primary-side winding, wherein adjusting the discharge current is further based on the first peak voltage and the second peak voltage, and wherein the discharge current defined by the second amount of current is indicative of a predicted discharge time of the secondary-side winding during the second switching cycle.

Example 16

The method of any combination of examples 12-15, wherein determining whether the discharge time of the capacitor is equal to the discharge time of the secondary-side winding comprises: determining, by the controller, that the discharge time of the capacitor is equal to the discharge time of the secondary-side winding in response to determining that: a first difference between the first held voltage and the second held voltage satisfies a first threshold voltage; and a second difference between the second held voltage and the third held voltage does not satisfy a second threshold voltage; and determining, by the controller, that the discharge time of the capacitor is not equal to the discharge time of the secondary-side winding in response to determining that: the first difference between the first held voltage and the second held voltage does not satisfy a first threshold voltage; or the second difference between the second held voltage and the third held voltage satisfies a second threshold voltage.

Example 17

The method of any combination of examples 12-16, further comprising: refraining, by the controller, from adjusting the discharge current in response to determining that the discharge time of the capacitor is equal to the discharge time of the secondary-side winding.

Example 18

The method of any combination of examples 12-17, wherein capacitor is a fourth capacitor, the method further comprising: holding, by a first capacitor of the controller, the first held voltage; holding, by a second capacitor of the controller, the second held voltage; holding, by a third capacitor of the controller, the third held voltage.

Example 19

A controller circuit for controlling the power converter, the controller circuit comprising a capacitor, wherein the controller circuit is configured to: charge the capacitor based on a peak voltage applied to a primary-side winding of a transformer of the power converter, after charging the capacitor, apply a discharge current defined by a first amount of current to the capacitor, responsive to discharging the capacitor to a reference voltage level, determine, based on a feedback voltage generated by a primary-side auxiliary winding of the transformer, whether a discharge time of the capacitor is equal to a discharge time of the secondary-side winding; and responsive to determining that the discharge time of the capacitor is not equal to the discharge time of the secondary-side winding, adjust the discharge current from the first amount of current to a second amount of current, wherein the second amount of current is indicative of a predicted discharge time of a secondary-side winding of the transformer.

Example 20

The controller circuit of example 19, wherein the controller circuit is configured to determine whether the discharge time of the capacitor is equal to the discharge time of the secondary-side winding by at least being configured to: sample the feedback voltage a first time to generate a first held voltage; sample the feedback voltage a second time to generate a second held voltage; and sample the feedback voltage a third time to generate the third held voltage, determine, based on the first held voltage, the second held voltage, and the third held voltage, whether the discharge time of the capacitor is equal to the first discharge time.

Example 21

A controller comprising means for any of the methods of examples 11-18.

Example 22

A power converter comprising a controller, the controller comprising means for any of the methods of examples 11-18.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of $IC_S$ (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A power converter comprising:
a transformer comprising a primary-side winding, a primary-side auxiliary winding, and a secondary-side winding;
a switch configured to coupled and de-couple the primary-side winding to and from a voltage source; and
a controller circuit comprising a capacitor, wherein the controller circuit is configured to:
charge the capacitor based on a peak voltage applied to the primary-side winding;
after charging the capacitor, apply a discharge current defined by a first amount of current to the capacitor,
responsive to discharging the capacitor to a reference voltage level, determine, based on a feedback voltage generated by the primary-side auxiliary winding, whether a discharge time of the capacitor is equal to a discharge time of the secondary-side winding by at least being configured to:
sample the feedback voltage a first time to generate a first held voltage;
sample the feedback voltage a second time to generate a second held voltage;
sample the feedback voltage a third time to generate the third held voltage; and
determine, based on the first held voltage, the second held voltage, and the third held voltage, whether the discharge time of the capacitor is equal to the first discharge time; and
responsive to determining that the discharge time of the capacitor is not equal to the discharge time of the secondary-side winding, adjust the discharge current from the first amount of current to a second amount of current, wherein the second amount of current is indicative of a predicted discharge time of the secondary-side winding.

2. The power converter of claim 1, wherein the controller circuit is configured to adjust the discharge current by at least being configured to:
responsive to determining that a first difference between the first held voltage and the second held voltage satisfies a first threshold voltage, and that a second difference between the second held voltage and the third held voltage satisfies a second threshold voltage, increase the discharge current from the first amount of current to a second amount of current that is greater than the first amount of current.

3. The power converter of claim 1, wherein the controller circuit is configured to adjust the discharge current by at least being configured to:
responsive to determining that a first difference between the first held voltage and the second held voltage does not satisfy a first threshold voltage, and that a second difference between the second held voltage and the third held voltage does not satisfy a second threshold voltage, decrease the discharge current from the first amount of current to a second amount of current that is less than the first amount of current.

4. The power converter of claim 1, wherein the peak voltage is a first peak voltage, wherein the controller circuit is configured to charge the capacitor to the first peak voltage during a first switching cycle, and wherein the controller circuit is further configured to:
  charge, during a second switching cycle of the switch, the capacitor based on a second peak voltage applied to the primary-side winding;
  wherein the controller circuit is configured to adjust the discharge current further based on the first peak voltage and the second peak voltage,
  wherein the discharge current defined by the second amount of current is indicative of a predicted discharge time of the secondary-side winding during the second switching cycle.

5. The power converter of claim 1, wherein the controller circuit is configured to determine whether the discharge time of the capacitor is equal to the discharge time of the secondary-side winding by at least being configured to:
  determine that the discharge time of the capacitor is equal to the discharge time of the secondary-side winding in response to determining that:
    a first difference between the first held voltage and the second held voltage satisfies a first threshold voltage; and
    a second difference between the second held voltage and the third held voltage does not satisfy a second threshold voltage; and
  determine that the discharge time of the capacitor is not equal to the discharge time of the secondary-side winding in response to determining that:
    the first difference between the first held voltage and the second held voltage does not satisfy a first threshold voltage; or
    the second difference between the second held voltage and the third held voltage satisfies a second threshold voltage.

6. The power converter of claim 1, wherein the controller circuit is further configured to refrain from adjusting the discharge current in response to determining that the discharge time of the capacitor is equal to the discharge time of the secondary-side winding.

7. The power converter of claim 1, wherein capacitor is a fourth capacitor, and wherein the controller circuit further comprises:
  a first capacitor configured to hold the first held voltage;
  a second capacitor configured to hold the second held voltage; and
  a third capacitor configured to hold the third held voltage.

8. The power converter of claim 1, wherein the controller circuit further comprises:
  a peak voltage detector configured to sample and hold the peak voltage applied to the primary-side winding;
  a voltage summing circuit configured to:
    sum the peak voltage and a reference voltage; and
    output the sum of the peak voltage and the reference voltage to charge the capacitor.

9. The power converter of claim 1, wherein the controller circuit further comprises a current source configured to generate the discharge current.

10. A method of controlling a power converter, the method comprising:
  charging, by a controller of the power converter, based on a peak voltage applied to a primary-side winding of a transformer of the power converter, a capacitor of the power converter;
  after charging the capacitor, applying, by the controller and to the capacitor, a discharge current defined by a first amount of current;
  responsive to discharging the capacitor to a reference voltage level:
    sampling, by the controller, a feedback voltage generated by a primary-side auxiliary winding of the transformer a first time to generate a first held voltage;
    sampling, by the controller, the feedback voltage a second time to generate a second held voltage;
    sampling, by the controller, the feedback voltage a third time to generate the third held voltage; and
    determining, by the controller, based on the first held voltage, the second held voltage, and the third held voltage, whether the discharge time of the capacitor is equal to the first discharge time; and
  responsive to determining that the discharge time of the capacitor is not equal to the discharge time of the secondary-side winding, adjusting, by the controller, the discharge current from the first amount of current to a second amount of current, wherein the second amount of current is indicative of a predicted discharge time of a secondary-side winding of the transformer.

11. The method of claim 10, wherein adjusting the discharge current comprises:
  responsive to determining that a first difference between the first held voltage and the second held voltage satisfies a first threshold voltage, and that a second difference between the second held voltage and the third held voltage satisfies a second threshold voltage, increasing, by the controller, the discharge current from the first amount of current to a second amount of current that is greater than the first amount of current.

12. The method of claim 10, wherein adjusting the discharge current comprises:
  responsive to determining that a first difference between the first held voltage and the second held voltage does not satisfy a first threshold voltage, and that a second difference between the second held voltage and the third held voltage does not satisfy a second threshold voltage, decreasing, by the controller, the discharge current from the first amount of current to a second amount of current that is less than the first amount of current.

13. The method of claim 10, wherein the peak voltage is a first peak voltage, and wherein the controller is configured to charge the capacitor to the first peak voltage during a first switching cycle, the method further comprising:
  charging, by the controller, during a second switching cycle of the switch, the capacitor based on a second peak voltage applied to the primary-side winding,
  wherein adjusting the discharge current is further based on the first peak voltage and the second peak voltage, and
  wherein the discharge current defined by the second amount of current is indicative of a predicted discharge time of the secondary-side winding during the second switching cycle.

14. The method of claim 10, wherein determining whether the discharge time of the capacitor is equal to the discharge time of the secondary-side winding comprises:
  determining, by the controller, that the discharge time of the capacitor is equal to the discharge time of the secondary-side winding in response to determining that:
    a first difference between the first held voltage and the second held voltage satisfies a first threshold voltage; and a second difference between the second held voltage and the third held voltage does not satisfy a second threshold voltage; and determining, by the controller, that the discharge time of the capacitor is not equal to the discharge time of the secondary-side winding in response to determining that:

the first difference between the first held voltage and the second held voltage does not satisfy a first threshold voltage; or the second difference between the second held voltage and the third held voltage satisfies a second threshold voltage.

15. The method of claim 10, further comprising:

refraining, by the controller, from adjusting the discharge current in response to determining that the discharge time of the capacitor is equal to the discharge time of the secondary-side winding.

16. The method of claim 10, wherein capacitor is a fourth capacitor, the method further comprising:

holding, by a first capacitor of the controller, the first held voltage;

holding, by a second capacitor of the controller, the second held voltage;

holding, by a third capacitor of the controller, the third held voltage.

17. A controller circuit for controlling a power converter, the controller circuit comprising a capacitor, wherein the controller circuit is configured to:

charge the capacitor based on a peak voltage applied to a primary-side winding of a transformer of the power converter;

after charging the capacitor, apply a discharge current defined by a first amount of current to the capacitor, responsive to discharging the capacitor to a reference voltage level:

sample, a feedback voltage generated by a primary-side auxiliary winding of the transformer a first time to generate a first held voltage;

sample the feedback voltage a second time to generate a second held voltage;

sample the feedback voltage a third time to generate the third held voltage; and determine, based on the first held voltage, the second held voltage, and the third held voltage, whether the discharge time of the capacitor is equal to the first discharge time; and responsive to determining that the discharge time of the capacitor is not equal to the discharge time of the secondary-side winding, adjust the discharge current from the first amount of current to a second amount of current, wherein the second amount of current is indicative of a predicted discharge time of a secondary-side winding of the transformer.

* * * * *